(12) United States Patent
Marshall et al.

(10) Patent No.: US 7,146,297 B2
(45) Date of Patent: Dec. 5, 2006

(54) DETECTING COLLISIONS OF THREE-DIMENSIONAL MODELS

(75) Inventors: Carl S. Marshall, Portland, OR (US); Adam T. Lake, Portland, OR (US); Oliver A. Heim, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 774 days.

(21) Appl. No.: 10/108,615

(22) Filed: Mar. 27, 2002

(65) Prior Publication Data

US 2003/0184603 A1 Oct. 2, 2003

(51) Int. Cl.
*G06F 7/48* (2006.01)
*G06T 13/00* (2006.01)

(52) U.S. Cl. .............................. 703/6; 703/4; 345/958; 345/473

(58) Field of Classification Search .................... 703/4, 703/7, 11, 14; 716/2–4, 7–8; 345/419–420, 345/958, 621, 630
See application file for complete search history.

(56) References Cited

U.S. PATENT DOCUMENTS

| | | | |
|---|---|---|---|
| 4,600,919 A | 7/1986 | Stern | |
| 4,747,052 A | 5/1988 | Hishinuma et al. | |
| 4,835,712 A | 5/1989 | Drebin et al. | |
| 4,855,934 A | 8/1989 | Robinson | |
| 4,901,064 A | 2/1990 | Deering | |
| 5,124,914 A | 6/1992 | Grangeat | |
| 5,163,126 A | 11/1992 | Einkauf et al. | |
| 5,371,778 A | 12/1994 | Yanof et al. | |
| 5,611,030 A | 3/1997 | Stokes | |
| 5,731,819 A | 3/1998 | Gagne et al. | |
| 5,757,321 A | 5/1998 | Billyard | |
| 5,786,822 A | 7/1998 | Sakaibara | |
| 5,805,782 A | 9/1998 | Foran | |
| 5,809,219 A | 9/1998 | Pearce et al. | |
| 5,812,141 A | 9/1998 | Kamen et al. | |
| 5,847,712 A | 12/1998 | Salesin et al. | |
| 5,894,308 A | 4/1999 | Isaacs | |
| 5,929,860 A | 7/1999 | Hoppe | |
| 5,933,148 A | 8/1999 | Oka et al. | |
| 5,949,969 A | 9/1999 | Suzuoki et al. | |
| 5,966,133 A | 10/1999 | Hoppe | |
| 5,966,134 A | 10/1999 | Arias | |
| 5,974,423 A | 10/1999 | Margolin | |
| 6,054,999 A | 4/2000 | Strandberg | |
| 6,057,859 A | 5/2000 | Handelman et al. | |
| 6,078,331 A | 6/2000 | Pulli et al. | |
| 6,115,050 A | 9/2000 | Landau et al. | |
| 6,175,655 B1 | 1/2001 | George et al. | |

(Continued)

OTHER PUBLICATIONS

Jeff Lander, When Two Hearts Collide: Axis-Aligned Bounding Boxes,Gamasutra,Feb. 3, 2000☐☐URL:http://www.gamasutra.com/features/20000203/lander_01.htm.*

(Continued)

*Primary Examiner*—Kamini Shah
*Assistant Examiner*—David Silver
(74) *Attorney, Agent, or Firm*—Fish & Richardson P.C.

(57) ABSTRACT

Detecting a collision of a three-dimensional model from three-dimensional data defining a bone includes obtaining a bounding volume for the bone, detecting a collision of the three-dimensional model with a second three-dimensional model using the bounding volume, and applying a collision response only to a colliding area of the three-dimensional model and the second-three-dimensional model.

33 Claims, 8 Drawing Sheets

U.S. PATENT DOCUMENTS

| | | | |
|---|---|---|---|
| 6,191,787 B1 | 2/2001 | Lu et al. | |
| 6,191,796 B1 | 2/2001 | Tarr | |
| 6,198,486 B1 | 3/2001 | Junkins et al. | |
| 6,208,347 B1 | 3/2001 | Migdal et al. | |
| 6,219,070 B1 | 4/2001 | Baker et al. | |
| 6,201,549 B1 | 5/2001 | Bronskill | |
| 6,239,808 B1 | 5/2001 | Kirk et al. | |
| 6,252,608 B1 | 6/2001 | Snyder et al. | |
| 6,262,737 B1 | 7/2001 | Li et al. | |
| 6,262,739 B1 | 7/2001 | Migdal et al. | |
| 6,292,192 B1 | 9/2001 | Moreton | |
| 6,317,125 B1 | 11/2001 | Persson | |
| 6,337,880 B1 | 1/2002 | Cornog et al. | |
| 6,388,670 B1 | 5/2002 | Naka et al. | |
| 6,405,071 B1 | 6/2002 | Analoui | |
| 6,437,782 B1 | 8/2002 | Pieragostini et al. | |
| 6,478,680 B1 | 11/2002 | Yoshioka et al. | |
| 6,559,848 B1 | 5/2003 | O'Rourke | |
| 6,593,924 B1 | 7/2003 | Lake et al. | |
| 6,593,927 B1 | 7/2003 | Horowitz et al. | |
| 6,608,627 B1 | 8/2003 | Marshall et al. | |
| 6,608,628 B1 | 8/2003 | Ross et al. | |
| 6,747,651 B1 * | 6/2004 | Tan et al. | 345/474 |
| 2001/0026278 A1 | 10/2001 | Arai et al. | |
| 2002/0101421 A1 | 8/2002 | Pallister | |

OTHER PUBLICATIONS

Nick Bobic, Advanced Collision Detection Techniques,Gamasutra,Mar. 30, 2000 ☐☐URL:http://www.gamasutra.com/features/20000330/bobic_01.htm.*

PlanetHalfLife.com, http://www.planethalflife.com/cs/.*

SummerBlue.net, http://www.summerblue.net/games/cs_report/1_1_introduction.html, Mar. 2002.*

SummerBlue, http://www.summerblue.net/games/cs_report/9_3_impact_momentum.html, Mar. 2002.*

Jeff Lander, "Collision Response: Bouncy, Trouncy, Fun", Gamasutra, Feb. 8, 2000 URL: http://www.gamasutra.com/features/20000208/lander_01.htm.*

Matthew Moore et al, "Collision detection and response for computer animationr3", 1988, Proceedings of the 15th annual conference on Computer graphics and interactive techniques table of contents, pp.: 289-298.* photoneffect.com, http://web.archive.org/web/20010630202306rn_1/photoneffect.com/coldet/, May 29, 2001.*

Cordier et al, Integrated system for skin deformation, IEEEXplorer, Computer Animation 2000. Proceedings, Publication Date: May 3-5, 2000, On pp.: 2-8.*

Alliez et al., "Progressive Compression for Lossless Transmission of Triangle Meshes," *ACM SIGGRAPH 2001*, pp. 195-202 (2001).

Bajaj et al., "Progressive Compression and Transmission of Arbitrary Triangular Meshes," *IEEE*, pp. 307-316 (1999).

Buck et al., "Performance-Driven Hand Drawn Animation", *ACM* (NPAR2000), pp. 101-108 (2000).

Chow, M., "Optimized Geometry Compression for Real-time Rendering," *IEEE*, pp. 347-354 (1997).

Cohen-Or, D. et al., "Progressive Compression of Arbitrary Triangular Meshes," *IEEE Visualization 99* Conference Proc., pp. 67-72 (1999).

Dyn, N. et al., "A Butterfly Subdivision Scheme for Surface Interpolation with Tension Control," *ACM Transactions on Graphics*, 9(2):160-169 (1990).

Elber, Gershon, "Line Art Rendering via a Coverage of Isoperimetric Curves," IEEE Transactions on Visualization and Computer Graphics, 1 (3):231-239 (1995).

Elber, Gershon, "Interactive Line Art Rendering of Freeform Surfaces", *Eurographics'99*, 18(3):C1-C12 (1999).

Hoppe, H., "Progressive Meshes," URL: http://www.research.microsoft.com/research/graphics/hoppe/, (10 pgs.).

Hoppe, H., "Efficient Implementation of Progressive Meshes," Comput. & Graphics, 22(1), pp. 27-36 (1998).

Hoppe, H., "View-Dependent Refinement of Progressive Meshes", URL: http://www.research.microsoft.com/~hoppe/ (10 pgs.).

Kumar et al., "Interactive Display of Large Scale NURBS Models", *ACM*, Symp. On Interactive 3D Graphics, pp. 51-58 (1995).

Lander, Jeff, "Making Kine More Flexible,"Game Developer Magazine, 5 pgs., Nov. 1998.

Lander, Jeff, "Skin Them Bones," Game Developer Magazine, 4 pgs., May 1998.

Lansdown et al., "Expressive Rendering: A Review of Nonphotorealistic Techniques," IEEE Computer Graphics & Applications, pp. 29-37 (1995).

Lasseter, J. et al., "Principles of Traditional Animation Applied to 3D Computer Animation," *ACM*, pp. 35-44 (1987).

Lee, M. et al., "Navigating Through Triangle Meshes Implemented as Linear Quadtrees," *ACM Transactions on Graphics*, 19(2):79-121 (2000).

Lewis, J. P. et al., "Pose Space Deformation: A Unified Approach to Shape Interpolation and Skeleton-Driven Deformation," *ACM*, (SIGGRAPH 2000), pp. 165-172 (2000).

Pedersen, "A Framework for Interactive Texturing on Curved Surfaces", *ACM*, pp. 295-301 (1996).

Pueyo, X. et al., "Rendering Techniques '96," Proc. of Eurographics Rendering Workshop 1996, EUROGRAPHICS, pp. 61-70 (1996).

Raskar, R. et al., "Image Precision Silhouette Edges," Symposium on Interactive 3D Graphics, *ACM*, pp. 135-231 (1999).

Samet, Hanan, "Applications of Spatial Data Structures: Computer Graphics, Image Processing, and GIS," University of Maryland, Addison-Wesley Publishing Company, 1060-1064, Reading, MA, Jun. 1990.

Sousa, M., et al., "Computer-Generated Graphite Pencil Rendering of 3-D Polygonal Models", Eurographics'99, 18(3):C195-C207 (1999).

Stam, J., "Exact Evaluation of Catmull-Clark Subdivision Surfaces at Arbitrary Parameter Values", SIGGRAPH 98 Conference Proceedings, Annual Conference Series, pp. 395-404 (1998).

Taubin et al., "3D Geometry Compression", SIGGRAPH'98 Course Notes (1998).

Taubin et al., "Progressive Forest Spilt Compression," IBM T.J. Watson Research Center, 9 pgs. (1998).

Thomas (Contributor) et al., "The Illusion of Life: Disney Animation" 47-51.

Zeleznik et al., "SKETCH: An Interface for Sketching 3D Scenes" Brown University site of the NSF Science and Technology Center for Computer Graphics and Scientific Visualization, 1996.

Zorin "Interpolation Subdivision for Meshes With Arbitrary Topology" Department of Computer Science, California Institute of Technology, Pasadena, CA.

Lander "Skin Them Bones: Game Programming for the Web Generation" *Game Developer Magazine*, 11-16, 1998.

Lander "Making Kine More Flexible" *Game Developer Magazine*, 15-22, 1998.

"pmG Introduces Messiah: Animate 3.0", URL: http://www.digitalproducer.com/aHTM/Articles/july_2000/july_17_00/pmg_intros_messiah_animate.htm (Accessed Oct. 26, 2004) 2 pgs.

Appel, Arthur, "The Notion of Quantitative Invisibility and the Machine Rendering of Solids." Proceedings of 22nd National Conference Association for Computing Machinery 1967.

Catmull et al., "Recursively Generated B-Spline Surfaces on Arbitrary Topological Meshes," Computer Aided Design, 10(6):350-355 (1978).

Coelho et al., "An Algorithm for Intersecting and Trimming Parametric Meshes", *ACM* SIGGRAPH, pp. 1-8 (1998).

Deering, M., "Geometry Compression," *Computer Graphics*. SIGGRAPH '95, pp. 13-20, 1995.

DeRose et al., "Subdivisional Surfaces in Character Animation", *ACM*, SIGGRAPH'98, pp.85-94 (1998).

Gooch et al., "A Non-Photorealistic Lighting Model for Automatic Technical Illustration," *Computer Graphics Proceedings, Annual Conference Series, SIGGRAPH'98*, pp. 447-452 (1998).

Gooch et al., "Interactive Technical Illustration," *ACM Interactive 3D*, pp. 31-38 (1999).

Heidrich et al., "Realistic, Hardware-Accelerated Shading and Lighting," *ACM*, (SIGGRAPH'99), pp. 171-178 (1999).

Lake et al., "Stylized Rendering Techniques for Scalable Real-Time 3D Animation", NPAR, pp. 101-108 (2000).

Ma et al., "Extracting Feature Lines for 3D Unstructured Grids," *IEEE*, pp. 285-292 (1997).

Markosian, L. et al., "Real-Time Nonphotorealistic Rendering," SIGGRAPH'97, 6 pgs. (1997).

Pajarola et al., "Compressed Progressive Meshes" *IEEE Transactions on Visualization and Computer Graphics*, 6(1):79-93 (2000).

Popovic et al., "Progressive Simplicial Complexes" Microsoft Research, http://www.research.microsft.com/~hoppe/.

Rockwood, A. et al., "Real-time Rendering of Trimmed Surfaces," Computer Graphics (SIGGRAPH '89 Proceedings) 23:107-116 (1989).

Wilhelms J. & Van Gelder, A., "Anatomically Based Modeling," Univ. California Santa Cruz [online], 1997 [retrieved Dec. 22, 2004], retrieved from the Internet: <URL: http://graphics.stanford.edu/courses/cs448-01-spring/papers/wilhelms.pdf>.

* cited by examiner

DETECTING COLLISIONS OF THREE-DIMENSIONAL MODELS

TECHNICAL FIELD

This application relates to detecting collisions of virtual three-dimensional (3D) models.

BACKGROUND

A virtual 3D model (hereinafter, simply "3D model") includes a virtual skeleton, comprised of virtual bones arranged in a hierarchical tree structure. Surrounding the bones are polygons, such as triangles, which represent the skin of the 3D model. Movement of the polygons is tied to the movement of the bones so that the 3D model approximates real-life movement when the bones are repositioned.

When a 3D model collides with another 3D model, the resulting collision may affect the position and shape of one or both models. That is, the models move and/or deform in approximately the same manner as corresponding real-life characters would in a real-life collision.

DESCRIPTION OF THE DRAWINGS

Like reference numerals in different figures indicate like elements.

DESCRIPTION

The process described herein detects collisions between bounding volumes associated with a 3D model and bone of another 3D model. In this regard, a bounding volume is a 3D space that encompasses the bone or model. When a collision is detected, the process can stop and apply a collision response using information determined from the collided bounding volumes. Lower level testing (e.g., at the polygon level) beyond this point is optional and may be performed if the user wants a more accurate collision detection and response.

If more accurate detection is desired, then the process transforms only the vertices associated with the collided bone and performs polygon level collision testing with the other model's bounding volume. In this way it is not necessary to transform an entire model's vertices in response to collision.

Figure 1:
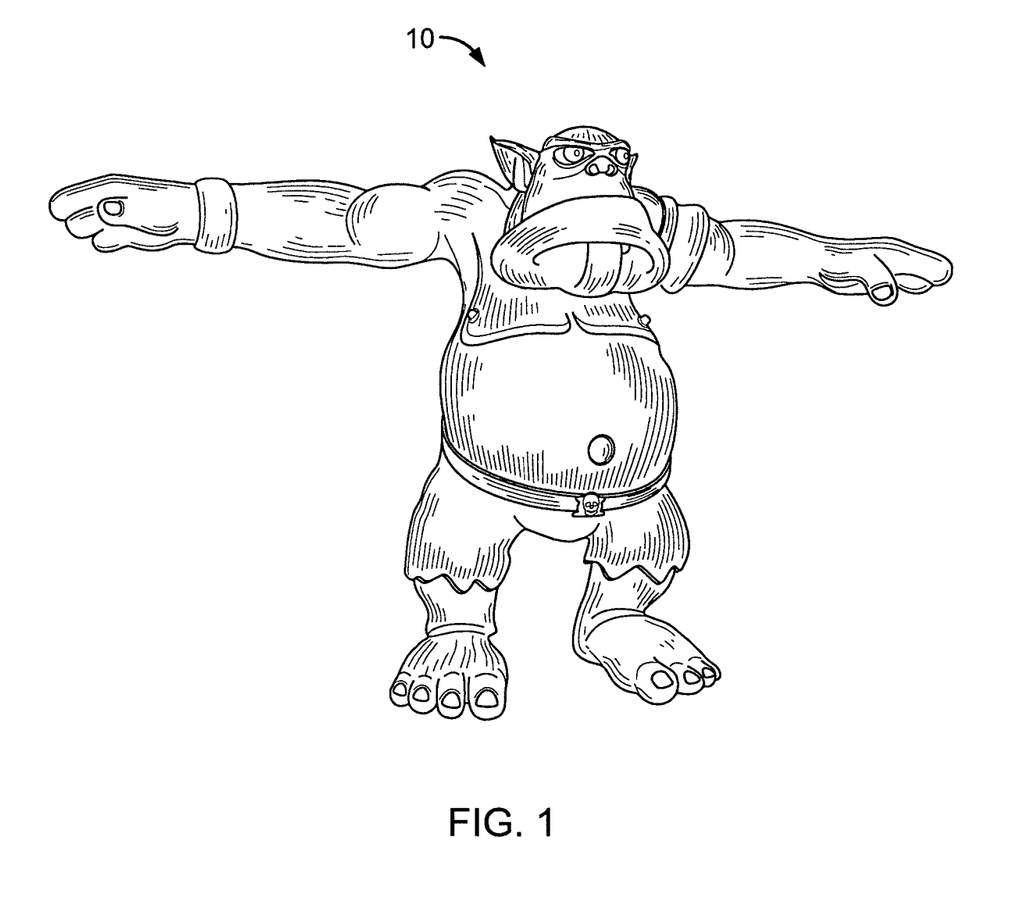
FIG. 1 is a view of a 3D model.
Figure 2:
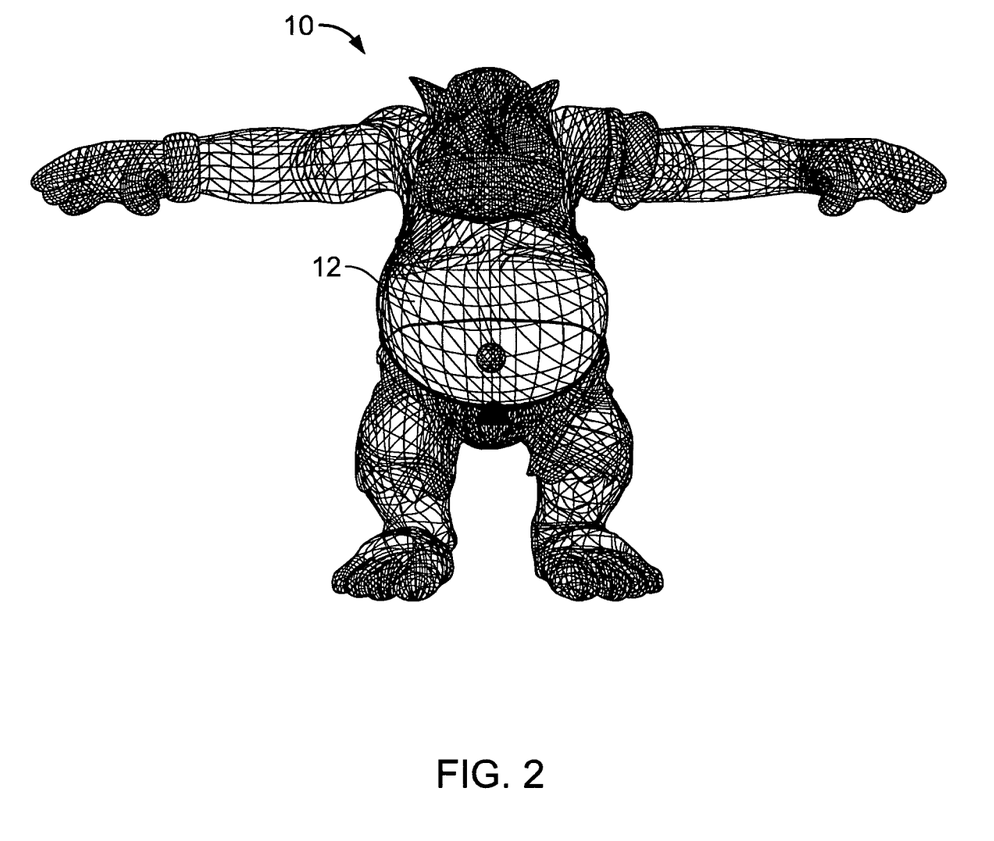
FIG. 2 is a view of polygons that make up the 3D model.

FIG. 1 shows a 3D model 10, which is rendered from 3D data. As shown in FIG. 2, 3D model 10 is comprised of interconnecting polygons 12. Polygons 12 are triangles in this embodiment; however, other types of polygons may be used. Polygons 12 define the "skin" surface of 3D model 10.

Figure 3:
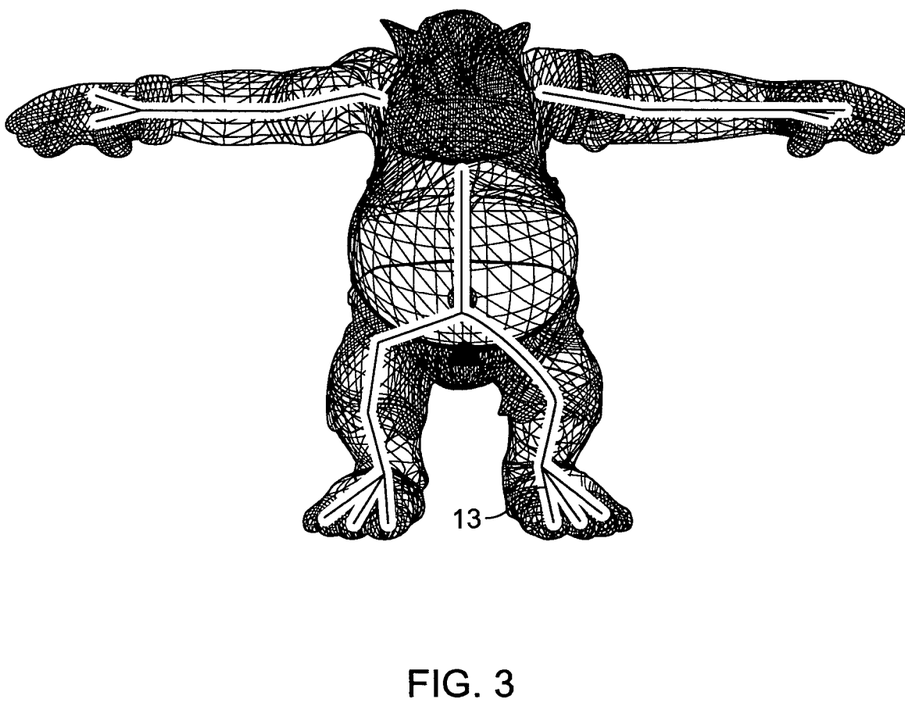
FIG. 3 is a view of bones that make up the 3D model.

The 3D data for model 10 also includes bone data. The bone data defines a rigid skeletal structure of model 10, which corresponds to the bones of a living being. The "bones" 13 of model 10 are Cartesian XYZ-space vectors in the 3D data (FIG. 3). The bone data defines a magnitude of the XYZ-space vectors and an orientation in XYZ-space of the vectors.

The bones of model 10 may be linked together in a tree-like hierarchical structure, with "child" bones branching off from "parent" bones. Vertices of polygons 12 are associated with one or more bones such that motion of the vertices is tied to motion of the bones. The association is defined in the 3D data that makes up 3D model 10. A polygon deforms around a bone that the polygon is associated with much the same way that skin surrounding living bone deforms in response to an applied force, such as a collision. The bones may change location in response to force, but do not change shape.

The movement of 3D model 10 is defined by a sequence of frames, which constitute snapshots of the 3D model at intervals of time. Each frame contains information about the position of a bone in 3D space at a particular instant in time. This information includes the displacement of the start of the bone from the end of its parent bone, the orientation of the bone relative to the orientation of its parent bone, one or more scaling factors that define the scale of the bone in 3D space, and the time of the displacement, orientation and scaling. Displacement and scale are represented as 3D vectors (e.g., Cartesian XYZ-space vectors). Orientation may be represented by rotation data, such as rotation matrices, Euler angles, or unit magnitude quaternions.

Matrix transforms are generally used to change the position of a bone from frame to frame. Matrix transforms may also be used to change the positions of polygon vertices to correspond to changes in positions of the bones.

Movement and deformations of a 3D model in response to a collision are determined based on the mechanics of the bone structure controlling the model. For example, as the leg of a biped (human-like) model collides with a ball, the leg will generally move in response, as will the ball.

Figure 4:
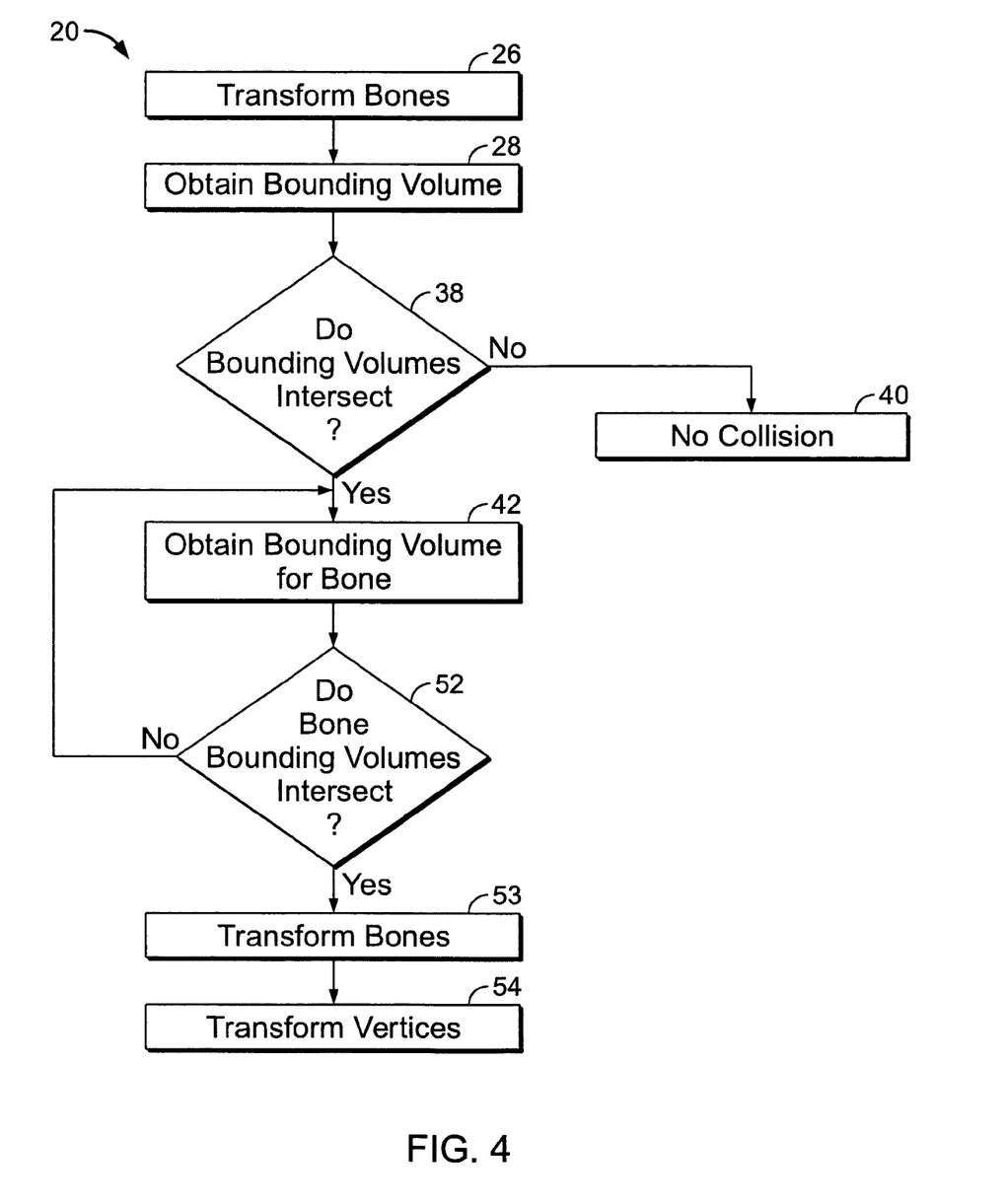
FIG. 4 is a flowchart showing a process for detecting a collision of the 3D model with another 3D model.

Referring to FIG. 4, a process 20 is shown for detecting and rendering collisions of a 3D model with another object. Process 20 is described with respect to 3D model (duck) 22 shown in FIG. 5 colliding with 3D model (ball) 24.

Process 20 transforms (26) bones in duck 22 and ball 24 to reposition the two 3D models (e.g., for a collision). It is noted that inanimate objects, such as ball 24, may contain bones that provide structural support, even though their "real-life" counterparts would not contain real bones.

Figure 6:
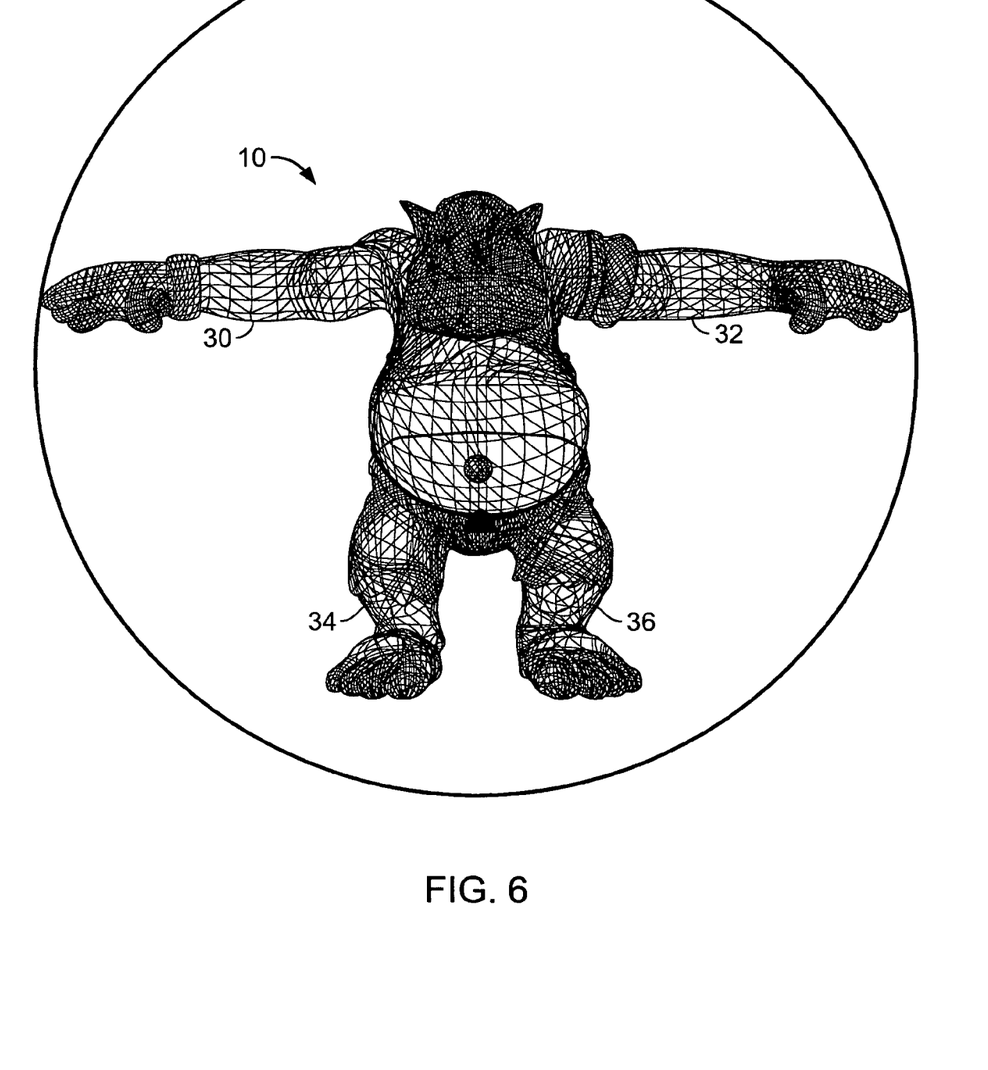
FIG. 6 is a view of a bounding volume for a 3D model.

Process 20 obtains (28) a bounding volume for duck 22 and ball 24. In this embodiment, the bounding volume is a sphere that encompasses a maximum extended range of motion of a 3D model. For example, in the case of 3D model 10 (FIG. 6), the bounding volume is constructed by determining the maximum extended range of motion of arms 30 and 32 and legs 34 and 36, and then creating a minimum-volume sphere that encompasses the maximum range of motion of the 3D model's arms and legs. Bounding volumes other than spheres may be used.

Figures 5, 7, 8:
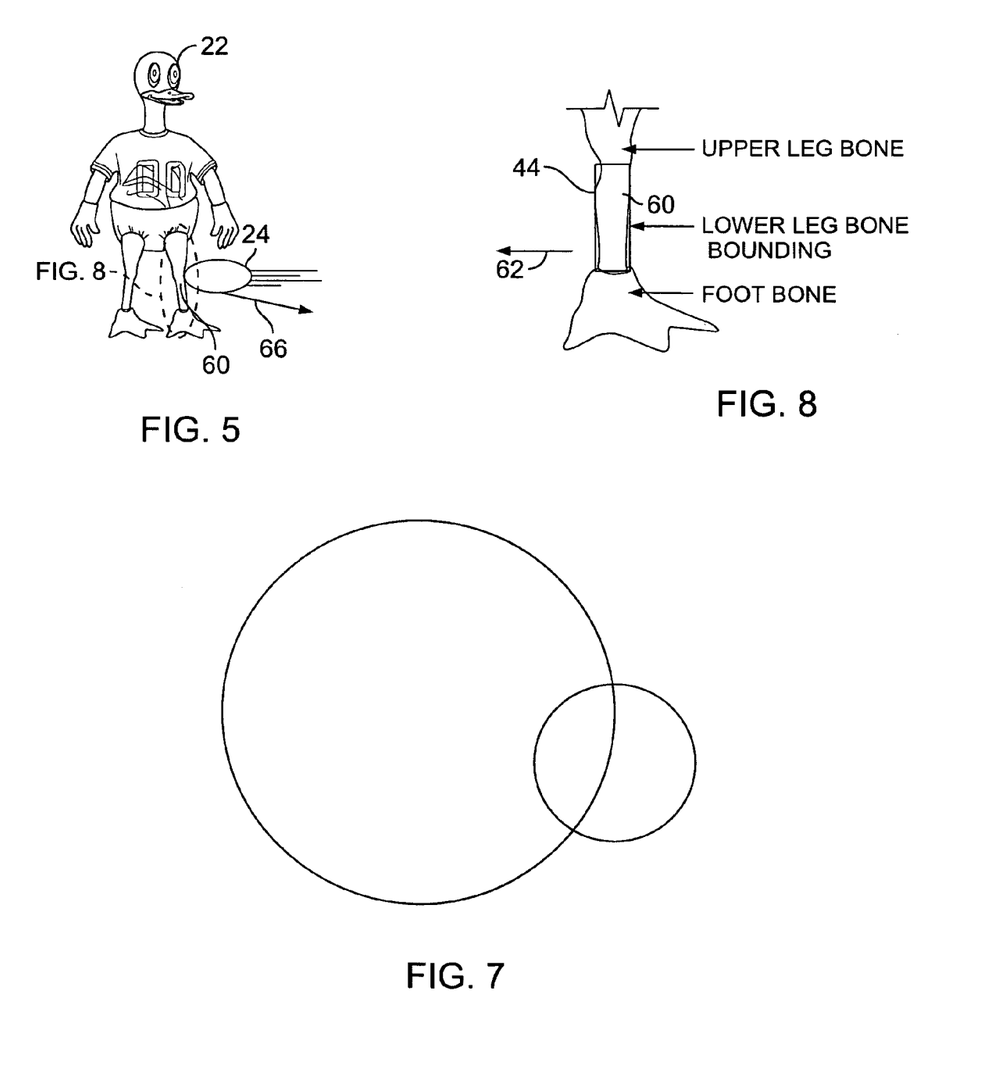
FIG. 5 is a view of two 3D models colliding.
FIG. 7 is a view of two bounding volumes intersecting.
FIG. 8 is a close-up view of a leg of one of the 3D models shown in FIG. 5.

Returning to the duck/ball example, process 20 determines (38) if the bounding volume of duck 22 intersects the bounding volume of ball 24. Intersection of the two bounding volumes is shown in FIG. 7. Intersection is determined by comparing coordinates of the two bounding volumes. If the coordinates of the bounding volumes overlap, intersection has occurred; otherwise there is no intersection. If the two bounding volumes intersect, a collision is detected; otherwise there is no collision (40).

Figure 9:
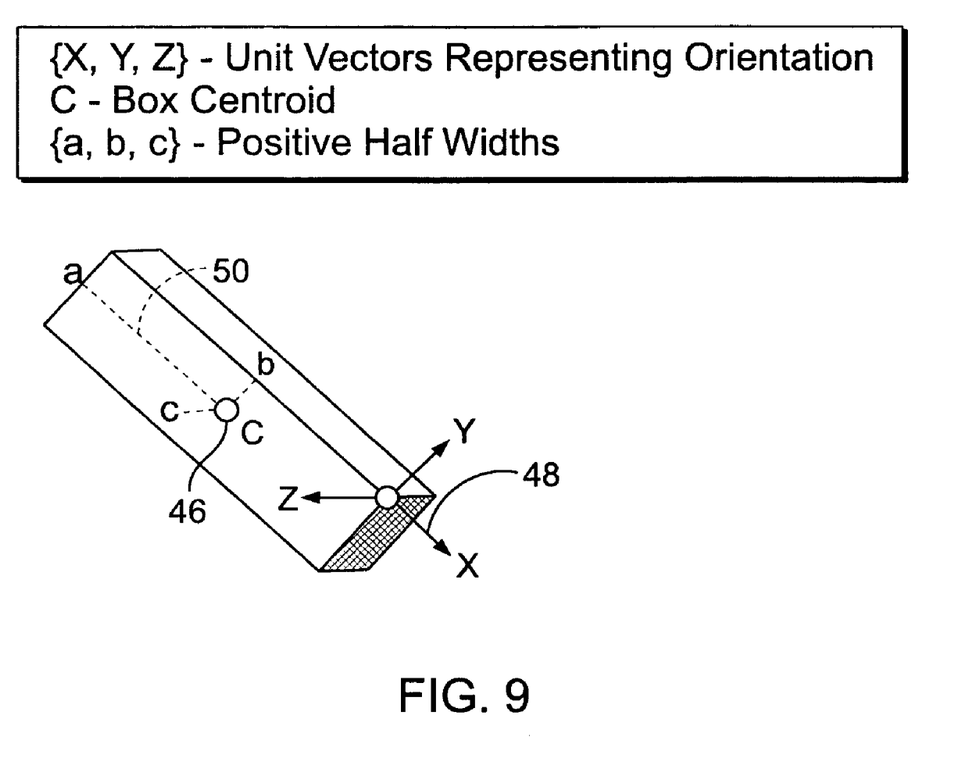
FIG. 9 is a view of a bounding volume for a 3D model.

If process 20 determines (38) that the two bounding volumes intersect (i.e., process 20 detects a collision), process 20 obtains (42) bone bounding volumes for one or more bones of duck 22 and ball 24. As shown in FIGS. 5 and 8, a bone bounding volume 44 is a 3D block having a minimum volume that encompasses a bone of a 3D model. A 3D rectangular bounding volume with non-equal dimensions is shown in FIG. 8; however, any shape may be used (e.g., a cylindrical bounding volume may be used). Referring to FIG. 9, the orientation of the bounding volume is defined by a centroid (C) 46 and three orthogonal unit vectors (XYZ) 48. These unit vectors correspond to the vectors defining the bone encompassed by the bounding volume. Three positive half-lengths (abc) 50 define the extents of the bounding volume along its axes.

Bounding volumes for all of the bones of a 3D model may be obtained beforehand and stored in memory. Thus, obtaining (42) the bounding volume may simply require retrieving the appropriate bounding volume(s) from memory. Alternatively, bounding volumes for the bones may be determined "on-the-fly", i.e., during run-time as process 20 executes.

For simple models, such as ball 24 (FIG. 5), it may not be necessary to create a bounding volume. Instead, the bounding volume of the simple 3D model (and the bounding volume of a more complex 3D model, such as duck 22) may be used together in detecting a collision between the two 3D models. For the sake of the following, however, it is assumed that a bounding volume is also created for ball 24.

Accordingly, process 20 obtains (42) a bone bounding volume of duck 22 and determines (52) if that bone bounding volume intersects (i.e., comes into contact with) the bounding volume of ball 24. If there is an intersection, process 20 proceeds. If not, process 20 returns, obtaining (42) a new bone bounding volume for duck 22 and determining (52) if the newly-obtained bone bounding volume intersects the bounding volume of ball 24. This is repeated until process 20 determines which bone bounding volume(s) of duck 22 intersect the bounding volume of ball 24, thus indicating a collision.

By using bone bounding volumes to detect a collision, process 20 provides an advantage over other collision detection techniques. That is, other such techniques test the polygons in a 3D model in order to detect a collision. Process 20 may only test bounding volumes, and not polygons, thereby reducing the amount of calculations required to detect, and simulate, a collision.

Once process 20 determines which bone bounding volume(s) of duck 22 intersect the bounding volume of ball 24, process 20 transforms (53) bones (i.e., applies a collision response) in response to the collision and transforms (54) polygon vertices to coincide with the bone transformation performed earlier. These transformations are performed in accordance with associated vertex weights in order to reposition the polygons ("skin") to correspond to the new positions of the bones. Although shown in FIG. 4 at this time, the transformation (54) of the vertices may be performed at any time after transformation (26) of the bone positions.

Process 20 scales well because it is possible to determine the collision response solely from the intersection of the bone bounding volumes, rather than going to the polygon (e.g., triangle) level. That is, the polygons need not be tested. Polygons may, however, be tested, if a user wants the increased accuracy that may result from lower-level testing.

For example, process 20 may identify polygons in the bone bounding volume(s) that intersect the bounding volume of ball 24. This may be done by comparing coordinates of vertices of polygons in the bounding volume to the coordinates of the bounding volume of ball 24. A comparison of some, or all, of the polygons in the bounding volume(s) that intersect may be performed. As noted, testing at the polygon level is not necessary, a collision may be detected, and the collision response applied, solely using bounding volumes.

Process 20 applies a collision response only to the polygons that intersect the bounding volume of ball 24. This collision response may include transforming vertices of, and/or normal vectors to, the affected polygons to achieve movement of those polygons in response to the collision. The transformation simulates movement resulting from a collision. For example, leg 60 (FIG. 8) of duck 22 may jerk backwards (direction 62) in response to the collision with ball 24.

Using process 20, it is possible to transform only the vertices associated with the collided bone and perform polygon level collision testing with the other model's bounding volume. In this way, the process need never transform an entire model's vertices during collision detection.

On the other hand, process 20 may also identify which polygons in the bounding volume of ball 24 intersect the bounding volume(s) of duck 22. This may be done in order to apply a collision response to the ball. These processes are identical to those above. So, for example, ball 24 may bounce off of leg 60 (e.g., direction 66—FIG. 5) in response to the collision. As noted, the collision may be detected, and a response applied, without going to the polygon level.

Figure 10:
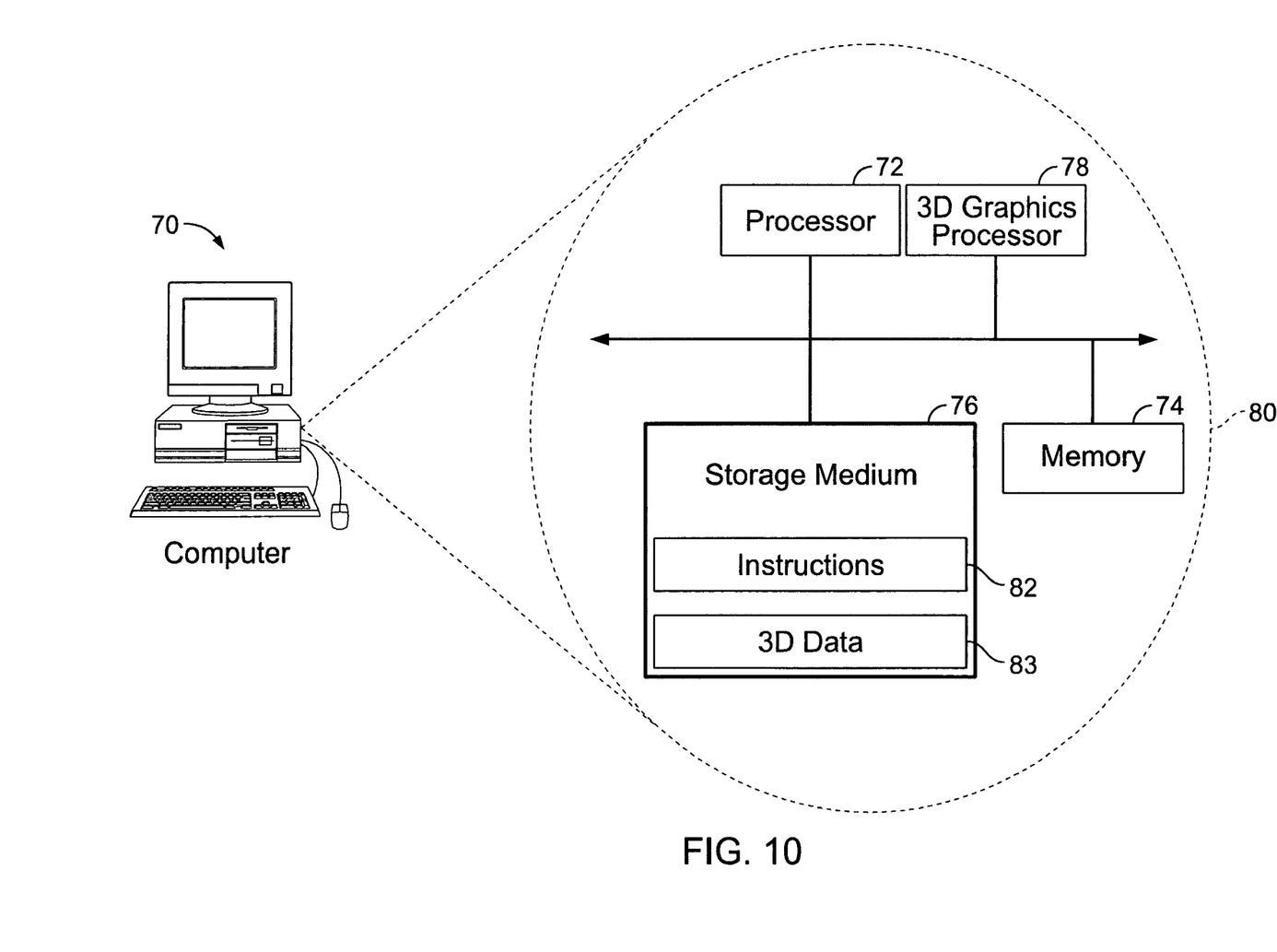
FIG. 10 is a view of computer hardware on which the process of FIG. 4 may be implemented.

FIG. 10 shows a computer 70 for detecting a collision using process 20. Computer 70 includes a processor 72, a memory 74, a storage medium 76 (e.g., a hard disk), and a 3D graphics processor 78 for repositioning a 3D model and processing 3D data (see view 80). Storage medium 76 stores 3D data 83 that defines the 3D model, and machine-executable instructions 82, which are executed by processor 72 out of memory 74 to perform process 20 on 3D data 83.

Process 20, however, is not limited to use with the hardware and software of FIG. 10; it may find applicability in any computing or processing environment. Process 20 may be implemented in hardware, software, or a combination of the two. Process 20 may be implemented in computer programs executing on programmable computers that each includes a processor, a storage medium readable by the processor (including volatile and non-volatile memory and/or storage elements), at least one input device, and one or more output devices. Program code may be applied to data entered using an input device, such as a mouse or a keyboard, to perform process 20 and to generate output information.

Each such program may be implemented in a high level procedural or object-oriented programming language to communicate with a computer system. However, the programs can be implemented in assembly or machine language. The language may be a compiled or an interpreted language.

Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform process 20. Process 20 may also be implemented as a machine-readable storage medium, configured with a computer program, where, upon execution, instructions in the computer program cause a machine to operate in accordance with process 20.

Process 20 scales well because it is possible to determine the collision response solely from the intersection of the bounding volumes, rather than going to the polygon (e.g., triangle) level. That is, the polygons need not be tested. Although less accurate, scaling process 20 in this manner makes process 20 more usable on less-powerful computers and faster for those requiring less accurate results.

Other embodiments not described herein are also within the scope of the following claims. For example, the blocks of FIG. 4 may be rearranged and/or executed out of order to produce a similar result.

What is claimed is:

1. A method of detecting a collision of a first three-dimensional model comprised of three-dimensional data defining a bone, the method comprising:
    obtaining a model bounding volume for the first three-dimensional model;
    detecting a collision of the first three-dimensional model with a second three-dimensional model using the model bounding volume;
    obtaining a bone bounding volume that encompasses a bone of the first three-dimensional model, wherein obtaining comprises:
        determining a minimum volume that encompasses the bone;
        determining an orientation of the bone; and
        constructing the bone bounding volume to have the minimum volume and the orientation;
    obtaining a location of the collision of the first three-dimensional model with the second three-dimensional model using the bone bounding volume; and
    applying a collision response to the location of the collision of the first three-dimensional model and the second three-dimensional model.

2. The method of claim 1, wherein obtaining the location of the collision comprises:
    determining if the bone bounding volume intersects a second model bounding volume associated with the second three-dimensional model.

3. The method of claim 2, wherein the first three-dimensional model includes polygons that cover the bone; and
    obtaining the location of the collision further comprises:
        determining whether to detect at a polygon level; and
        determining if at least one of the polygons intersects the second model bounding volume.

4. The method of claim 1, further comprising:
    applying the collision response to the bone based on obtaining the location of the collision.

5. The method of claim 1, wherein obtaining the location of the collision using the bone bounding volume is performed if a collision is detected using the model bounding volume.

6. The method of claim 1, wherein obtaining the model bounding volume comprises:
    determining a maximum extended range of motion of the first three-dimensional model; and
    constructing the model bounding volume to encompass the maximum extended range of motion.

7. A method of detecting a collision of a first three-dimensional model comprised of three-dimensional data defining a bone, the method comprising:
    obtaining a first bounding volume that encompasses the first three-dimensional model; and
    determining if the first bounding volume intersects a second bounding volume of a second three-dimensional model;
    wherein, if the first bounding volume intersects the second bounding volume, the method further comprises:
        obtaining a first bone bounding volume that encompasses a bone of the first three-dimensional model, wherein obtaining the first bone bounding volume comprises:
            determining a minimum volume that encompasses the bone;
            determining an orientation of the bone; and
            constructing the first bone bounding volume to have the minimum volume and the orientation; and
        determining if the first bone bounding volume intersects a second bone bounding volume that encompasses a bone of the second three-dimensional model;
    wherein, if the first bone bounding volume intersects the second bone bounding volume, the method further comprises:
        determining whether to perform further detection testing at a polygon level.

8. The method of claim 7, wherein, if it is determined not to perform further detection testing, the method further comprises applying a collision response to an area where the first bone bounding volume intersects the second bone bounding volume.

9. An article comprising a machine-readable medium that stores executable instructions to detect a collision of a first three-dimensional model comprised of three-dimensional data defining a bone, the instructions causing a machine to:
    obtain a model bounding volume for the first three-dimensional model;
    detect a collision of the first three-dimensional model with a second three-dimensional model using the model bounding volume;
    obtain a bone bounding volume that encompasses a bone of the first three-dimensional model, wherein obtaining the bone bounding volume comprises:
        determining a minimum volume that encompasses the bone;
        determining an orientation of the bone; and
        constructing the bone bounding volume to have the minimum volume and the orientation;
    obtain a location of the collision of the first three-dimensional model with the second three-dimensional model using the bone bounding volume; and
    apply a collision response to the location of the collision of the first three-dimensional model and the second three-dimensional model.

10. The article of claim 9, wherein obtaining the location of the collision comprises:
    determining if the bone bounding volume intersects a second model bounding volume associated with the second three-dimensional model.

11. The article of claim 10, wherein the first three-dimensional model includes polygons that cover the bone; and
    obtaining the location of the collision further comprises:
        determining whether to detect at a polygon level; and
        determining if at least one of the polygons intersects the second model bounding volume.

12. The article of claim 9, further comprising instructions that cause the machine to:
    apply the collision response to the bone based on obtaining the lacation of the collision.

13. The article of claim 9, wherein obtaining the location of the collision using the bone bounding volume is performed if a collision is detected using the model bounding volume.

14. The article of claim 9, wherein obtaining the model bounding volume comprises:
   determining a maximum extended range of motion of the first three-dimensional model; and
   constructing the model bounding volume to encompass the maximum extended range of motion.

15. An article comprising a machine-readable medium that stores executable instructions to detect a collision of a first three-dimensional model comprised of three-dimensional data defining a bone, the instructions causing a machine to:
   obtain a first bounding volume that encompasses the first three-dimensional model; and
   determine if the first bounding volume intersects a second bounding volume of a second three-dimensional model;
   wherein, if the first bounding volume intersects the second bounding volume, the instructions cause the machine to:
      obtain a first bone bounding volume that encompasses a bone of the first three-dimensional model, wherein obtaining the first bone bounding volume comprises:
         determining a minimum volume that encompasses the bone;
         determining an orientation of the bone; and
         constructing the first bone bounding volume to have the minimum volume and the orientation; and
      determine if the first bone bounding volume intersects a second bone bounding volume that encompasses a bone of the second three-dimensional model;
   wherein, if the first bone bounding volume intersects the second bone bounding volume, the instructions cause the machine to:
      determine whether to perform further detection testing at a polygon level.

16. The article of claim 15, wherein, if it is determined not to perform further detection testing, the instructions cause the machine to apply a collision response to an area where the first bone bounding volume intersects the second bone bounding volume.

17. An apparatus for detecting a collision of a three-dimensional model comprised of three-dimensional data defining a bone, the apparatus comprising:
   a memory that stores executable instructions; and
   a processor that executes the instructions to:
      obtain a model bounding volume for the first three-dimensional model;
      detect a collision of the first three-dimensional model with a second three-dimensional model using the model bounding volume;
      obtaining a bone bounding volume that encompasses a bone of the first three-dimensional model, wherein obtaining the bone bounding volume comprises:
         determining a minimum volume that encompasses the bone;
         determining an orientation of the bone; and
         constructing the bone bounding volume to have the minimum volume and the orientation;
      obtain a location of the collision of the first three-dimensional model with the second three-dimensional model using the bone bounding volume; and
      apply a collision response to the location of the collision of the first three-dimensional model and the second three-dimensional model.

18. The apparatus of claim 17, wherein obtaining the location of the collision comprises:
   determining if the bone bounding volume intersects a second model bounding volume associated with the second three-dimensional model.

19. The apparatus of claim 18, wherein the first three-dimensional model includes polygons that cover the bone; and
   obtaining the location of the collision further comprises:
      determining whether to detect at a polygon level; and
      determining if at least one of the polygons intersects the second model bounding volume.

20. The apparatus of claim 17, wherein the processor executes instructions to:
   apply the collision response to the bone based on obtaining the location of the collision.

21. The apparatus of claim 17, wherein obtaining the location of the collision using the bone bounding volume is performed if a collision is detected using the model bounding volume.

22. The apparatus of claim 17, wherein obtaining the model bounding volume comprises:
   determining a maximum extended range of motion of the first three-dimensional model; and
   constructing the model bounding volume to encompass the maximum extended range of motion.

23. An apparatus for detecting a collision of a first three-dimensional model comprised of three-dimensional data defining a bone, the apparatus comprising:
   memory that stores executable instructions; and
   a processor that executes the instructions to:
   obtain a first bounding volume that encompasses the first three-dimensional model; and
   determine if the first bounding volume intersects a second bounding volume of a second three-dimensional model;
   wherein, if the first bounding volume intersects the second bounding volume, the processor executes instructions to:
      obtain a first bone bounding volume that encompasses a bone of the first three-dimensional model, wherein obtaining the first bone bounding volume comprises:
         determining a minimum volume that encompasses the bone;
         determining an orientation of the bone; and
         constructing the first bone bounding volume to have the minimum volume and the orientation; and
      determine if the first bone bounding volume intersects a second bone bounding volume that encompasses a bone of the second three-dimensional model;
   wherein, if the first bone bounding volume intersects the second bone bounding volume, the processor executes instructions to:
      determine whether to perform further detection testing at a polygon level.

24. The apparatus of claim 23, wherein, if it is determined not to perform further detection testing, the processor executes instructions to apply a collision response to an area where the first bone bounding volume intersects the second bone bounding volume.

25. A method of detecting a collision of a first three-dimensional model comprised of three-dimensional data defining a bone, the method comprising:
- obtaining a model bounding volume for the first three-dimensional model;
- detecting a collision of the first three-dimensional model with a second three-dimensional model using the model bounding volume;
- obtaining a bone bounding volume that encompasses a bone of a first three-dimensional model, wherein obtaining the bone bounding volume comprises:
  - determining a minimum volume that encompasses the bone;
  - determining an orientation of the bone; and
  - constructing the bone bounding volume to have the minimum volume and the orientation;
- obtaining a location of the collision of the first three-dimensional model with the second three-dimensional model using the bone bounding volume and a second model bounding volume for the second three-dimensional model; and
- applying a collision response to the bone which transforms one or more polygon vertices associated with the bone.

26. The method of claim 25, wherein obtaining the location of the collision comprises:
- determining if the bone bounding volume intersects the second model bounding volume.

27. The method of claim 26, wherein the first three-dimensional model includes polygons that cover the bone; and
- obtaining the location of the collision further comprises determining if at least one of the polygons intersects the second model bounding volume.

28. An article comprising a machine-readable medium that stores executable instructions to detect a collision of a first three-dimensional model comprised of three-dimensional data defining a bone, the article comprising instructions that cause a machine to:
- obtain a model bounding volume for the first three-dimensional model;
- detect a collision of the first three-dimensional model with a second three-dimensional model using the model bounding volume;
- obtain a bone bounding volume that encompasses a bone of a first three-dimensional model, wherein obtaining the bone bounding volume comprises:
  - determining a minimum volume that encompasses the bone;
  - determining an orientation of the bone; and
  - constructing the bone bounding volume to have the minimum volume and the orientation;
- obtain a location of the collision of the first three-dimensional model with a second three-dimensional model using the bone bounding volume and a second model bounding volume for the second three-dimensional model; and
- apply a collision response to the bone which transforms one or more polygon vertices associated with the bone.

29. The article of claim 28, wherein obtaining the location of the collision comprises:
- determining if the bone bounding volume intersects the second model bounding volume.

30. The article of claim 29, wherein the first three-dimensional model includes polygons that cover the bone; and
- obtaining the location of the collision further comprises determining if at least one of the polygons intersects the second model bounding volume.

31. An apparatus for detecting a collision of a first three-dimensional model comprised of three-dimensional data defining a bone, the apparatus comprising:
- memory that stores executable instructions; and
- a processor that executes the instructions to;
  - obtain a model bounding volume for the first three-dimensional model;
  - detect a collision of the first three-dimensional model with a second three-dimensional model using the model bounding volume;
  - obtain a bone bounding volume that encompasses a bone of a first three-dimensional model, wherein obtaining comprises:
    - determining a minimum volume that encompasses the bone;
    - determining an orientation of the bone; and
    - constructing the bone bounding volume to have the minimum volume and the orientation;
  - obtain a location of the collision of the first three-dimensional model with a second three-dimensional model using the bone bounding volume and a second model bounding volume for the second three-dimensional model; and
  - apply a collision response to the bone which transforms one or more polygon vertices associated with the bone.

32. The apparatus of claim 31, wherein obtaining the location of the collision comprises:
- determining if the bone bounding volume intersects the second model bounding volume.

33. The apparatus of claim 32, wherein the first three-dimensional model includes polygons that cover the bone; and
- obtaining the location of the collision further comprises determining if at least one of the polygons intersects the second model bounding volume.

* * * * *